(12) United States Patent
Choy

(10) Patent No.: US 7,589,498 B2
(45) Date of Patent: Sep. 15, 2009

(54) BATTERY DISCHARGE CURRENT SHARING IN A TIGHTLY REGULATED POWER SYSTEM

(75) Inventor: Winnie Choy, Cerritos, CA (US)

(73) Assignee: The Boeing Company, Chicago, IL (US)

( * ) Notice: Subject to any disclaimer, the term of this patent is extended or adjusted under 35 U.S.C. 154(b) by 402 days.

(21) Appl. No.: 11/736,306

(22) Filed: Apr. 17, 2007

(65) Prior Publication Data
US 2008/0258685 A1 Oct. 23, 2008

(51) Int. Cl.
*H01M 10/46* (2006.01)
(52) U.S. Cl. ....................................... 320/119
(58) Field of Classification Search ................. 320/103, 320/107, 114, 116, 118, 119, 132; 307/66
See application file for complete search history.

(56) References Cited

U.S. PATENT DOCUMENTS 6,208,039 B1    3/2001    Mendelsohn et al.
2006/0043747 A1 *  3/2006   Kniss ........................... 294/65
2006/0043793 A1 *  3/2006   Hjort et al. ..................... 307/1

* cited by examiner

*Primary Examiner*—Edward Tso
(74) *Attorney, Agent, or Firm*—Rozenblat IP LLC

(57) ABSTRACT

In a high power system, plural batteries provide back-up power when primary power is unavailable. Each battery has an associated discharge controller which is controlled by a local bus control amplifier which regulates the power bus voltage set-point lower than the main bus voltage set-point. A single main bus control amplifier tightly regulates the power bus to a main bus voltage set-point and controls charging and discharging of all batteries to prevent charging of one battery at the expense (discharge) of another battery. There is one master battery discharge controller, with the remaining controllers being slave units. A local bus voltage set-point of each slave unit varies under the control of a slave unit current sharing amplifier which compares its own discharge current to the average discharge current, and an error signal modifies the reference voltage in the local bus control amplifier to allow equal discharge current from all batteries.

21 Claims, 3 Drawing Sheets

BATTERY DISCHARGE CURRENT SHARING IN A TIGHTLY REGULATED POWER SYSTEM

FIELD OF THE INVENTION

This invention relates generally to regulated power systems and is particularly directed to a tightly regulated power system having plural batteries sharing equally to provide back-up power when the primary power source is unavailable.

BACKGROUND OF THE INVENTION

In a high power system, it is common to use multiple batteries to provide back-up power when the primary power source becomes unavailable. Sufficient energy storage is especially important in space systems which have to be fully operational in eclipse when solar energy is not available to a solar panel array. When multiple batteries are used, it is essential that these batteries discharge equally so (1) no battery is degraded or damaged due to over-discharge, and 2) battery capacity is utilized effectively.

If discharge current sharing control is not implemented in a multiple battery power system, the consequences will likely result in the following undesirable conditions. (1) Battery degradation or damage caused by over-discharging a battery which can lead to long term degradation or damage. In the case of over-discharging a Lithium-ion battery, the battery will give rise to a permanent short circuit. (2) Ineffective utilization of battery capacity involving the use of a scheme to terminate battery discharging in a nearly over-discharged battery by disabling its associated battery discharge power regulator. The power system is then current-limited by the remaining discharge power regulators. (Note: power regulators typically have a current limit for self-protection).

Several approaches are currently available to solve this problem. One approach is shown schematically in FIG. 1. In an unregulated power system, multiple batteries 10, 12 and 14 are respectively connected together through diodes 16, 18 and 20. Batteries with a higher state of charge (and higher voltage) will discharge first to balance the state of charge between batteries. A disadvantage of this approach is that an unregulated power system places the burden on the load unit to operate over a wide range of bus voltages. This type of power system typically results in higher mass and cost. In addition, when all the batteries do not have the same number of battery cells due to cell failure and cell bypass, the capacity from the battery with lower cell count cannot be utilized to the full extent.

Another approach is shown schematically in FIG. 2. This approach used in a regulated power system to avoid battery over-discharging divides the loads 28, 30 and 32 between batteries 22, 24 and 26 and the associated battery discharge control electronics. In this approach, current sharing is not required. A disadvantage of this approach is that a system in which the loads are divided in load groups and powered by separate batteries typically results in a heavier system. Each battery must be sized to account for the maximum load. Most space or airborne systems carry redundant units to meet reliability requirements. Thus, a power system of this type is sized to power both the primary and redundant units since the primary and redundant units are usually placed in separate load groups to avoid failure propagation.

A third approach is shown schematically in FIG. 3. In this approach, each power regulator is under the control of its associated control amplifier. A primary control amplifier regulates the primary power regulator when the primary power source is available. The battery power regulators are set up in a master-slave configuration. A master battery power regulator 48 including a first discharge control amplifier 50 and a first battery discharge controller 52 controls operation of a master battery 44. Each slave battery power regulator 53, each including a second discharge control amplifier 54 and a second battery discharge controller 55, controls the operation of each of the N plural slave batteries 46, where only one slave battery and slave battery power regulator are shown for simplicity. A current sharing control amplifier is used in each slave unit to force current sharing between batteries. In each slave unit, an error signal from a current sharing amplifier 56 is fed into its discharge control amplifier to adjust the bus voltage set-point. The bus voltage set-point in the master battery discharge controller is fixed. By varying the bus voltage set-points in each slave unit, battery current is forced to be shared among the N slave batteries. A disadvantage of this approach is that separate amplifiers controlling separate power regulators does not allow a very tightly regulated power bus. Primary power sourcing/battery charging and battery discharging in most power systems are typically autonomous without external control. Bus voltage is sensed to determine whether the system should be in primary power sourcing/battery charging mode or battery discharging mode. If each power regulator has its own bus control amplifier and the bus set-points of these regulators are set too close to each other, it will introduce the risk of discharging one battery to charge another battery.

The present invention avoids these problems encountered in the prior art by allowing for battery discharge current sharing in a multiple battery power system while maintaining a tightly regulated power bus. The risk of discharging one battery to charge another battery is eliminated in the inventive system where system mass is minimized such as for use in an aircraft or spacecraft environment.

OBJECTS AND SUMMARY OF THE INVENTION

Accordingly, it is an object of the present invention to provide a high power system having multiple batteries to provide back-up power when the primary power source is unavailable for protecting batteries against over-discharge and ensuring equal discharge current sharing for efficient battery capacity utilization.

It is another object of the present invention to provide battery discharge current sharing in a multiple battery back-up power system utilizing a single bus control amplifier for regulating the power bus voltage set-point while controlling battery charging and discharging, and plural slave current sharing amplifiers each associated with a respective battery to provide equal battery discharge current.

Yet another object of the present invention is to use multiple batteries to provide back-up power when the primary power source is unavailable in a high power system of reduced mass which is particularly adapted for use in a spacecraft such as during eclipse.

The present invention is intended for use in a regulated power system having a primary power source and plural batteries for providing back-up power, and contemplates an arrangement for tightly regulating primary power and back-up power and providing current sharing among the plural batteries. The arrangement comprises a main bus control amplifier for providing a control signal to both the primary power regulator and the battery discharge controllers for establishing a tightly regulated power bus voltage set-point. The primary power regulator has its own local bus control amplifier which is set at a higher bus voltage set-point. The local control amplifiers of the battery discharge controllers regulate at a lower bus voltage set-point. A negative control signal from the main bus control amplifier brings down the primary power regulator bus set-point to within a regulation range and activates all the battery chargers. A positive control signal raises up the battery discharge controller set-point to the same regulation range and inhibits battery charging. The power bus is thus tightly regulated. The single control amplifier eliminates the risk of discharging one battery to charge another battery. The current sharing amplifier in each slave battery power regulator, comparing its own discharge current to the average discharge current from all the batteries, outputs an error signal to modify the reference voltage in the slave local bus control amplifier. The local bus set-point in each slave unit thus varies to allow equal discharge current sharing from its associated battery.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
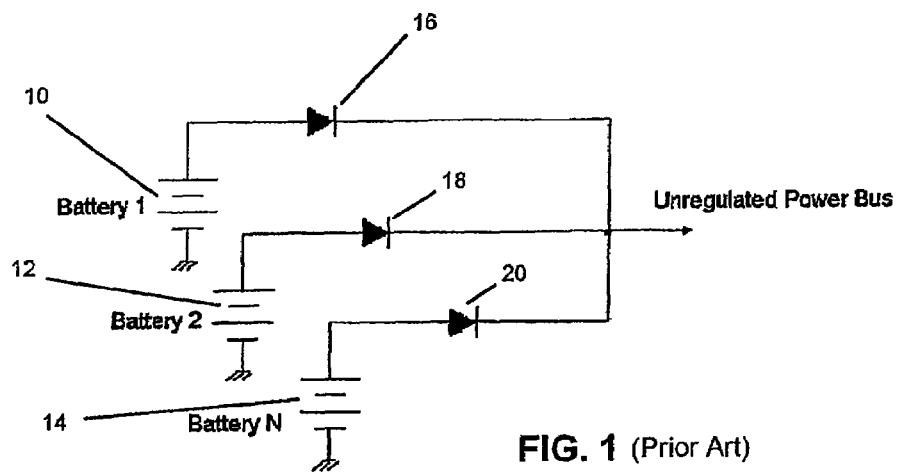
FIG. 1 is a simplified schematic diagram of a prior art multiple battery arrangement for providing back-up power in an unregulated power system.
Figure 2:
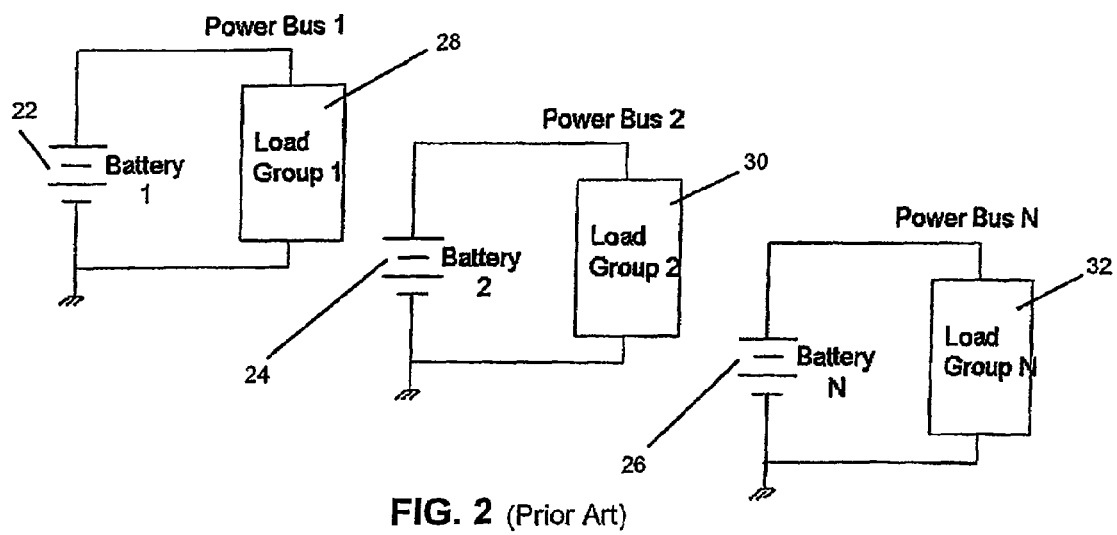
FIG. 2 is a simplified combined schematic and block diagram of a prior art multiple battery power system wherein a dedicated battery is provided for each load group.
Figure 3:
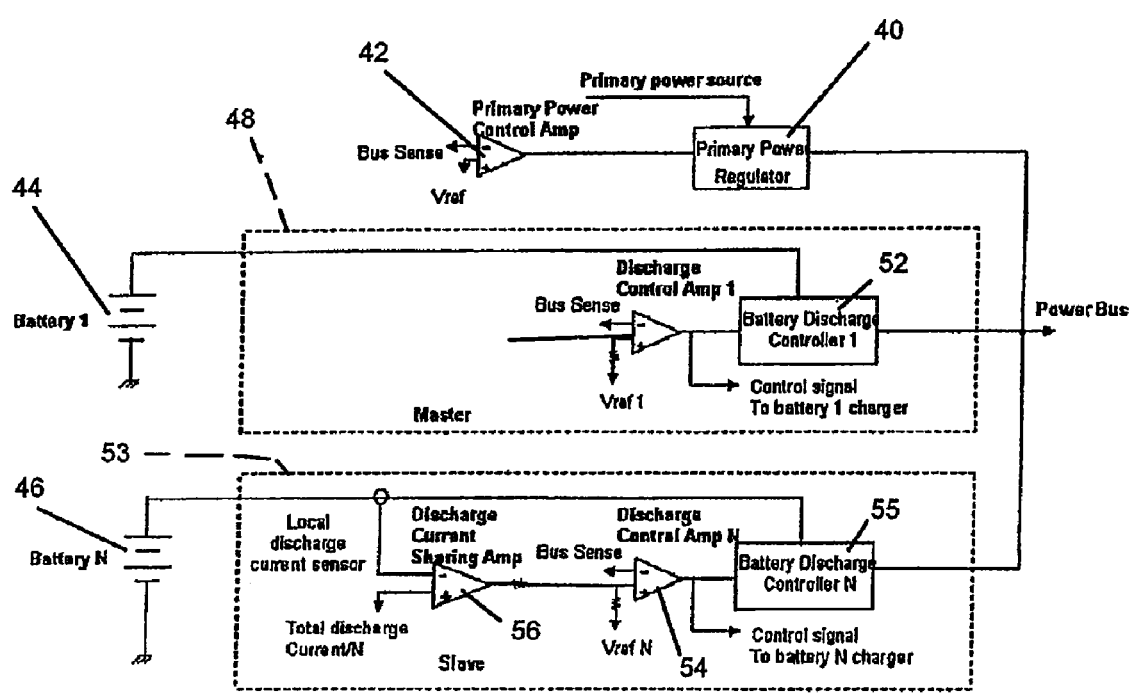
FIG. 3 is a simplified combined schematic and block diagram of a prior art multiple battery power system employing battery discharge current sharing such as used in a loosely regulated power system.
Figure 4:
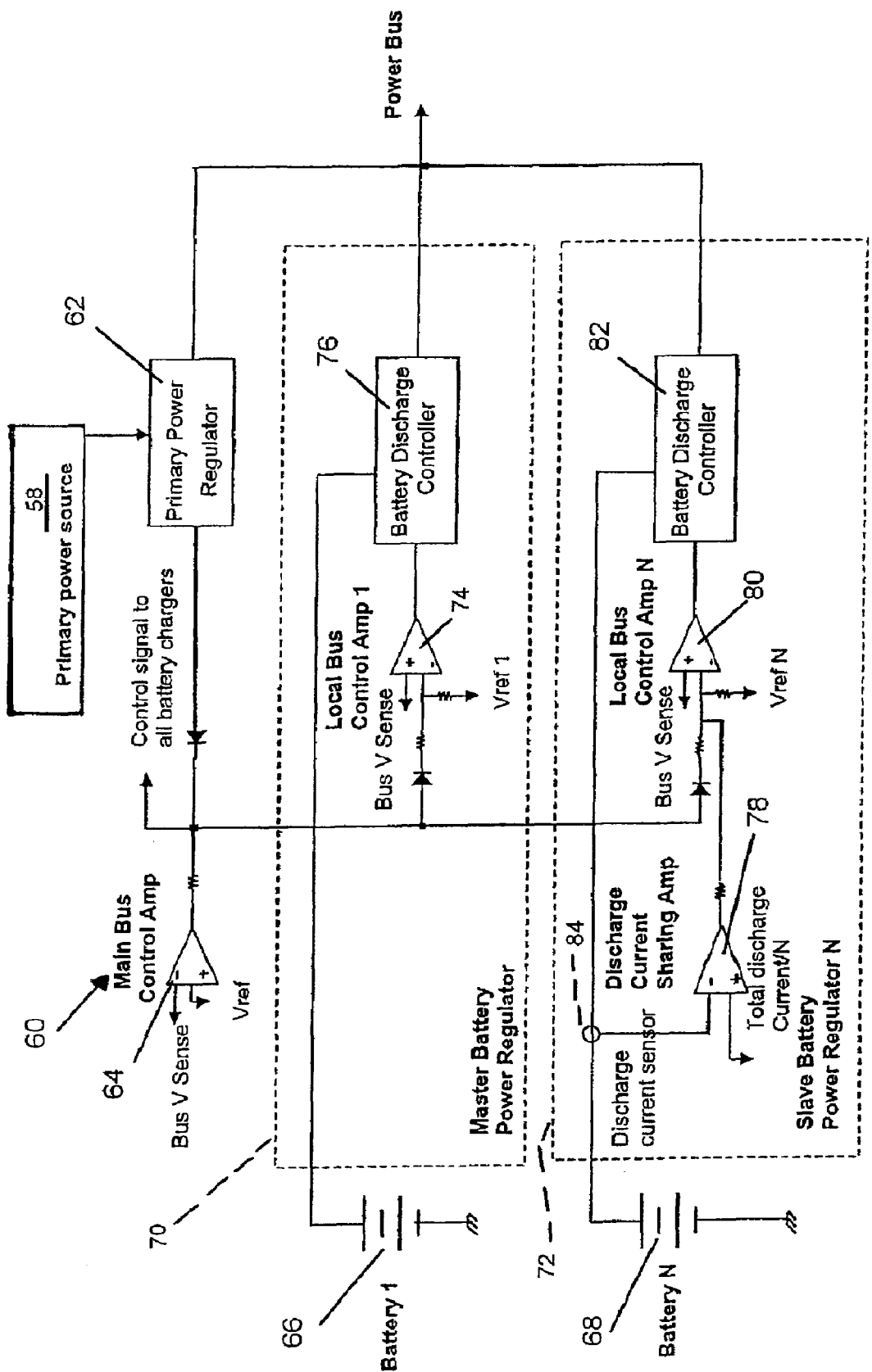
FIG. 4 is a simplified combined block and schematic diagram of a multiple battery power system employing battery discharge current sharing in a tightly regulated power system in accordance with the principles of the present invention.

Referring to FIG. 4, there is shown a tightly regulated power system 60 with battery discharge current sharing capability in accordance with the principles of the present invention. The tightly regulated power system 60 includes a primary power source 58 connected to a primary power regulator 62 for providing power to a power bus. The primary power source 58 may be virtually any type of arrangement for generating electric power which also operates with a battery back-up power system to provide power when the primary power source is unavailable. The inventive tightly regulated power system with battery discharge current sharing capability 60 is particularly adapted for use with a primary power source 58 comprised of a solar array such as used in a spacecraft where minimizing the mass of the power system is of critical importance and a battery back-up power capability is provided for the purpose of providing electric power during eclipse.

The tightly regulated power system 60 further includes a main bus control amplifier 64, a master back-up battery 66 in a master battery power regulator 70, and at least one slave battery 68 in a slave battery power regulator 72. Although only one slave battery power regulator 72 is shown in FIG. 4, virtually any number of additional slave battery power regulators could be incorporated in the present invention, with each additional slave battery power regulator being identical in configuration and operation to slave battery power regulator 72.

Each battery power regulator controls its associated battery. The output of the battery power regulators are connected in parallel to provide back-up power to the power bus.

The main bus control amplifier 64, an inverting error amplifier, receives two input signals and provides an output control signal to the primary power regulator 62. One input to the main bus control amplifier 64 is $V_{ref}$ which is a fixed reference voltage signal used to establish the required voltage on the main power bus. The other input signal to the main bus control amplifier 64 is a bus voltage sense signal which is compared to the $V_{ref}$ signal to output an error signal to control the primary bus regulator or the battery power regulators to maintain the required power bus voltage. For purposes of this discussion, the local set-point voltage of the primary power bus regulator is taken as 101 VDC. A negative output control signal provided by the main bus control amplifier 64 to the primary power regulator 62 lowers the primary power regulator to regulate the power bus voltage at a value slightly less than its local voltage set-point, such as at 100 VDC. A positive output control signal provided by the main bus control amplifier 64 indicates the unavailability of the primary power source 58 and enables the battery system to provide back-up power to the power bus. This corresponds to the situation of a spacecraft during eclipse. A negative output control signal from the main bus control amplifier 64 also activates all the battery chargers for all batteries 66 and 68, while a positive output signal from the main bus control amplifier prevents charging of any batteries as the batteries are discharging. Therefore, there is no risk of discharging one battery to charge another battery.

The battery back-up power system includes the master battery 66 and one or more slave batteries, where a first slave battery is shown as element 68. Operation of the master battery 66 is controlled by a master battery power regulator 70 which includes a first local bus control amplifier 74 and a first battery discharge controller 76. The operation of slave battery 68 is controlled by a slave battery power regulator 72 which includes a second local bus control amplifier 80 and second battery discharge controller 82.

The output control signal of the main bus control amplifier 64 is also provided to the first local bus control amplifier 74 in the master battery power regulator 70 as well as to the second local bus control amplifier 80 in slave battery power regulator 72. A positive control signal provided by the main bus control amplifier 64 to the first local bus control amplifier 74 and to the second local bus control amplifier 80 causes the local bus control amplifiers to raise the local bus voltage set-point from a set value such as 99 VDC to a value of 100 VDC for providing current to the power bus. These specific values are provided only for the purpose of explaining the operation of the present invention, as this invention is not limited to the specific voltage set-point values discussed herein. A positive control signal from the first local bus control amplifier 74 to the first battery discharge controller 76 enables the first battery discharge controller to provide current from the first master battery 66 to the main power bus. Similarly, a positive control signal from the second local bus control amplifier 80 enables the second battery discharge controller 82 to provide current from the slave battery 68 to the main power bus. This is the manner in which the power system 60 of the present invention provides tightly regulated power to the power bus either from the primary power source 58, when available, or from the master battery 66 and slave battery 68 when the primary power source is unavailable such as during eclipse as experienced by a spacecraft. A bus voltage sense signal is provided to one input of the first local bus control amplifier 74, while $V_{ref}1$ is provided to a second input of the first local bus control amplifier. $V_{ref}1$ is a reference signal for setting the first local bus control amplifier 74 to establish a bus voltage set-point of 99 VDC when the main bus control amplifier signal is negative or non-existent.

The output control signal of the main bus control amplifier 64 is also provided to a local bus amplifier within each of the slave battery power regulators including the second local bus control amplifier 80 within the slave battery power regulator 72. Provided to a second input of each of the remaining local bus control amplifiers including the second local bus control amplifier 80 is a $V_{ref}N$ reference voltage which is modulated as described below. A positive control signal from the main bus control amplifier 64 to the second local bus control amplifier 80 enables the second battery discharge controller 82 to increase the local bus voltage set-point from 99 VDC to approximately 100 VDC such as when the primary power source 58 is unavailable. Thus, when primary power is unavailable, the master battery 66 and all of the slave batteries including slave battery 68 provide current to the main power bus via the master battery power regulator 70 and each of the slave battery power regulators including slave battery power regulator 72. It is in this manner that the main bus control amplifier 64 ensures that a tightly regulated voltage is provided to the power bus when power is provided by the primary power source 58, as well as when power is provided by the master and slave batteries 66 and 68.

Each of the slave battery power regulators including slave battery power regulator 72 further includes a discharge current sharing amplifier 68 which receives a discharge current signal from its associated battery and a signal equal to the total discharge current divided by the number of batteries. In each of the slave battery power regulators is a discharge current sensor 84 as shown for slave battery power regulator 72 which senses the discharge current of slave battery 68 and provides an input to discharge current amplifier 78. A signal equal to the total battery discharge current divided by the number of batteries is derived by summing the total discharge current provided by all of the batteries divided by the number of batteries. The discharge current sharing amplifier 78 compares the discharge current of its associated slave battery 68 with the average discharge current of all the batteries for providing a current correction signal which is combined with the main bus control amplifier 64 control signal and the $V_{ref}N$ signal. This combined signal is provided to one input of the second local bus control amplifier 80 for comparison with the bus voltage sense signal input. The comparison of this composite current correction signal with the bus sense signal provided to the second local bus control amplifier 80 forces the second local bus control amplifier to output a current regulation signal to the second battery discharge controller 82 for equalizing the discharge current of the slave battery power regulator 72 with the average discharge current of all batteries. Thus, while the master battery power regulator 70 operates only under the control of the output from the main bus control amplifier 64, the slave battery power regulators in the system, including slave battery power regulators 72 and 73 shown in FIG. 4, are controlled not only by the output of the main bus control amplifier, but also by an output from discharge current sharing amplifier 78 which ensures that all batteries provide essentially the same current to the main power bus when the primary power source 58 is unavailable.

While particular embodiments of the present invention have been shown and described, it will be obvious to those skilled in the relevant arts that changes and modifications may be made without departing from the invention in its broader aspects. Thus, any such variations are within the scope and spirit of the broad concept and implementation of the present invention described herein. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A system for regulating primary power and back-up power to a main bus, the system comprising;
   a primary power source:
   a primary power regulator;
   a plurality of back-up power regulators each including:
      a battery; and
      a control amplifier configured to regulate power provided by the battery to the main power bus when the voltage on the main power bus drops below a voltage set-point;
   a main control amplifier connected to the control amplifier in each of the back-up power regulators; and
   a discharge current sharing amplifier for causing the discharge current of the battery of one of the back-up power regulators to be substantially equal to the average discharge current of the batteries of all of the back-up power regulators.

2. The system of claim 1 wherein said main control amplifier provides a first control signal to the control amplifier in each of the back-up power regulators for establishing a voltage set-point on the main power bus when the primary power source is not available.

3. The system of claim 2 wherein said main control amplifier is further coupled to said primary power regulator for establishing a voltage set-point on the main power bus when the primary power source is available.

4. The system of claim 3 wherein said main control amplifier provides a second control signal to said primary power regulator for establishing the voltage set-point on the main power bus when the primary power source is available and wherein said first and second control signals are of opposite sign.

5. The system of claim 4 wherein said main control amplifier compares a main power bus voltage sense signal with a main bus reference voltage signal in generating sent first and second control signals.

6. The system of claim 1 wherein each back-up power regulator further includes a local bus coupling its associated battery to the main power bus, and wherein the control amplifier of each back-up power regulator compares a main power bus voltage sense signal with a respective local bus reference voltage signal combined with said first control signal in regulating the local bus voltage to the main power bus voltage set-point.

7. The system of claim 6 wherein each back-up power regulator further include a respective discharge current sensor connecting its associated battery to a current sharing amplifier for providing an indication of battery current to the current sharing amplifier.

8. The system of claim 7 wherein each back-up power regulator further includes a discharge controller for preventing the discharge of a battery when any other battery is charging.

9. The system of claim 8 wherein each discharge controller disposed in a respective back-up power regulator is coupled to the battery and control amplifier in that back-up power regulator and is further coupled to the main power bus.

10. The system of claim 1 wherein said system powers a spacecraft.

11. The system of claim 1 wherein said system powers an aircraft.

12. A system for regulating primary power and back-up power to a main power bus, the system comprising:
   a primary power source;
   a primary power regulator;
   a plurality of back-up power regulators each including;
      a local bus;
      a battery; and
      a local control amplifier configured to regulate power provided by the battery via said local bus to the main power bus when the voltage on the main power bus drops below a voltage set-point;
   a main control amplifier connected to the local control amplifier in each of the back-up power regulators; and
   a discharge current sharing amplifier disposed in each of said back-up power regulators for comparing an output current of its associated battery with the average output current of all of the batteries for adjusting a local bus voltage set-point for causing its associated battery discharge current to be equal to the average output current of all of the batteries to equalize the load on all discharging batteries, and wherein said discharge current sharing amplifier is coupled to said local control amplifier for providing a voltage adjustment signal to said local control amplifier for adjusting the local bus voltage set-point on each of said local buses.

13. The system of claim 12 wherein said primary power regulator is coupled to said main control amplifier and responsive to a signal output by said main control amplifier for regulating voltage in the main power bus when the primary power source is available.

14. The system of claim 12 wherein said primary power regulator and each of said back-up power regulators compares a local bus sense signal with a respective local bus reference voltage signal combined with a control signal output by said main control amplifier in regulating local bus voltage provided to the main power bus.

15. The system of claim 14 wherein said control signal is a first sign for regulating voltage provided by the primary power source to the main power bus and is a second sign for regulating voltage provided by said back-up power regulators to the main power bus.

16. A system for regulating primary power and back-up power to a main power bus, the system comprising:
   a primary power source;
   a primary power regulator connecting the primary power source to the main power bus;
   a plurality of back-up power regulators each including;
      a local bus;
      a battery; and
      a local control amplifier configured to regulate power provided by the battery via said local bus to the main power bus when the voltage on the main power bus drops below a voltage set-point;
   a main control amplifier connected to the primary power regulator and to the local control amplifier in each of the back-up power regulators for outputting a first signal for establishing a main power bus voltage when the primary power source is available and for outputting a second signal to the local control amplifiers for controlling the discharge and charge of the batteries; and
   a discharge current sharing amplifier in each of the back-up power regulators for causing the discharge current of the battery in each of the back-up power regulators to be substantially equally to the average discharge current of all of the batteries.

17. The system of claim 16 further comprising means for generating a third signal representing the average discharge current of all of the batteries, and wherein the regulated power provided by each of the batteries to the main power bus is based on said second and third signals.

18. The system of claim 17 further comprising current sensing and amplification means coupling a battery and a local control amplifier in each back-up power regulator for comparing the average discharge current of the plural batteries with its associated battery discharge current and adjusting the voltage set-point of the battery discharge controller so as to match the average discharge current of the plural batteries.

19. The system of claim 18 further comprising means for generating a difference signal representing a difference between the average discharge current of the plural batteries and the discharge current one of the batteries.

20. The system of claim 19 wherein when said second signal allows all of the batteries to discharge while simultaneously preventing the charging of any of the batteries.

21. A system for regulating primary power and back-up power to a main power bus, the system comprising;
   a primary power source;
   a primary power regulator connecting the primary power source to the main power bus;
   a plurality of back-up power regulators each including;
      a local bus;
      a battery; and
      a local control amplifier configured to regulate power provided by the battery to the main power bus via the local bus when the voltage on the main power bus drops below a voltage set-point;
   a main control amplifier for providing a first signal for establishing a main bus voltage set-point to regulate main power bus voltage and enable plural battery charging, when the primary power source is available, and for providing a second signal to allow the discharge of and inhibit the charging of the batteries when the back-up power regulators provide power to the main power bus; and
   a discharge current sharing amplifier in each of the back-up power regulators for causing the discharge current of the battery in each of the back-up power regulators to be substantially equal to the average discharge current of all of the batteries.

* * * * *